(12) United States Patent
Tsukada et al.

(10) Patent No.: US 12,442,363 B2
(45) Date of Patent: Oct. 14, 2025

(54) LIQUID FEEDING PUMP AND LIQUID FEEDING METHOD

(71) Applicant: Hitachi High-Tech Corporation, Tokyo (JP)

(72) Inventors: Nobuhiro Tsukada, Tokyo (JP); Daisuke Akieda, Tokyo (JP); Yuichiro Hashimoto, Tokyo (JP); Sho Iwasa, Tokyo (JP); Yusuke Yota, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 413 days.

(21) Appl. No.: 17/791,593

(22) PCT Filed: Nov. 5, 2020

(86) PCT No.: PCT/JP2020/041326
§ 371 (c)(1),
(2) Date: Jul. 8, 2022

(87) PCT Pub. No.: WO2021/149325
PCT Pub. Date: Jul. 29, 2021

(65) Prior Publication Data
US 2023/0332586 A1  Oct. 19, 2023

(30) Foreign Application Priority Data

Jan. 20, 2020 (JP) .................. 2020-007067

(51) Int. Cl.
*F04B 23/06* (2006.01)
*F04B 1/02* (2006.01)
(Continued)

(52) U.S. Cl.
CPC ............... *F04B 23/06* (2013.01); *F04B 1/02* (2013.01); *F04B 11/0058* (2013.01);
(Continued)

(58) Field of Classification Search
CPC ........ F04B 23/06; F04B 1/02; F04B 11/0058; F04B 11/0075; F04B 13/02; F04B 49/065;
(Continued)

(56) References Cited

U.S. PATENT DOCUMENTS

2005/0023205 A1* 2/2005 Hiraku ................ F04B 11/0058
210/258
2006/0288803 A1* 12/2006 Weissgerber ........ G05D 11/132
73/865.8

(Continued)

FOREIGN PATENT DOCUMENTS

CN  103590993 A  2/2014
JP  2008-291848 A  12/2008
(Continued)

OTHER PUBLICATIONS

JP2008291848 translation (Year: 2024).*
(Continued)

*Primary Examiner* — David N Brandt
(74) *Attorney, Agent, or Firm* — Crowell & Moring LLP

(57) ABSTRACT

The present invention provides a technique that enables liquid feeding with small pulsation by reducing the volume of a liquid feeding pump. Disclosed is a liquid feeding pump comprising: a first plunger pump that has a first plunger; a second plunger pump that has a second plunger and is connected to the first plunger pump in series; a pressure sensor that is disposed on the downstream side of the second plunger pump; and a control unit that accepts an input of the discharge pressure of a liquid measured by the pressure sensor to control driving of the first plunger and driving of the second plunger, wherein when the first plunger pump compresses the liquid, the control unit drives the first plunger at a first speed, and then decreases the speed to a second speed slower than the first speed before the com- (Continued)

pression is completed, and wherein the control unit discharges the liquid from the second plunger pump by driving the second plunger in parallel with the driving of the first plunger.

3 Claims, 7 Drawing Sheets

(51) Int. Cl.

| | | |
|---|---|---|
| *F04B 11/00* | (2006.01) | |
| *F04B 13/02* | (2006.01) | |
| *F04B 23/02* | (2006.01) | |
| *F04B 49/02* | (2006.01) | |
| *F04B 49/06* | (2006.01) | |
| *F04B 49/08* | (2006.01) | |
| *F04B 49/20* | (2006.01) | |
| *G01N 30/32* | (2006.01) | |

(52) U.S. Cl.
CPC .......... *F04B 11/0075* (2013.01); *F04B 13/02* (2013.01); *F04B 49/065* (2013.01); *F04B 49/08* (2013.01); *F04B 49/20* (2013.01); *G01N 30/32* (2013.01); *F04B 23/028* (2013.01); *F04B 49/02* (2013.01); *F04B 2201/0202* (2013.01); *F04B 2205/05* (2013.01); *F04B 2205/065* (2013.01); *G01N 2030/326* (2013.01)

(58) Field of Classification Search
CPC ........ F04B 49/08; F04B 49/20; F04B 23/025; F04B 23/028; F04B 49/02; F04B 2201/0202; F04B 2205/05; F04B 2205/065; G01N 30/32; G01N 2030/326
See application file for complete search history.

(56) References Cited

U.S. PATENT DOCUMENTS

| | | | |
|---|---|---|---|
| 2012/0055581 A1 | 3/2012 | Akieda et al. | |
| 2013/0104631 A1* | 5/2013 | Tokuo | F04B 23/06 |
| | | | 73/61.56 |
| 2018/0245581 A1* | 8/2018 | Imamura | F04B 11/0058 |
| 2021/0156376 A1* | 5/2021 | Ogawa | F04B 49/065 |

FOREIGN PATENT DOCUMENTS

| | | | | |
|---|---|---|---|---|
| JP | 2008291848 | * | 12/2008 | .............. F04B 23/06 |
| JP | 2013217816 | * | 10/2013 | ............. G01N 30/32 |
| JP | 5624825 B2 | | 11/2014 | |
| WO | WO 2005/050190 A2 | | 6/2005 | |

OTHER PUBLICATIONS

JP2013217816 translation (Year: 2024).*
International Search Report (PCT/ISA/210) issued in PCT Application No. PCT/JP2020/041326 dated Dec. 8, 2020 with English translation (four (4) pages).
Chinese-language Office Action issued in Chinese Application No. 202080092039.4 dated Feb. 8, 2024 (8 pages).
Japanese-language Written Opinion (PCT/ISA/237) issued in PCT Application No. PCT/JP2020/041326 dated Dec. 8, 2020 (four (4) pages).

* cited by examiner

LIQUID FEEDING PUMP AND LIQUID FEEDING METHOD

TECHNICAL FIELD

The present disclosure relates to a liquid feeding pump and a liquid feeding method.

BACKGROUND ART

In analysis using a liquid chromatograph, a solvent for use is varied depending on a type of sample that is a measurement target, and a solvent in a liquid feeding pump has to be replaced each time prior to analysis. Therefore, in order to execute a large number of processes of analysis within a certain time period as various types of samples are targets, the replacement of the solvent has to be performed for a short time. In order to perform the replacement of the solvent for a short time, a reduction in the volume of the pump is effective.

Generally, a liquid feeding pump for use in a liquid chromatograph has a configuration in which two plunger pumps are connected in series. The plunger pump on the upstream side (first plunger pump) sucks, compresses, and discharges a solvent. Since feeding a liquid at a constant flow rate is not feasible when the first plunger pump alone is provided, another plunger pump (second plunger pump) is connected on the downstream side. The second plunger pump performs the operation of canceling the pulsation of the first plunger pump (a solvent is discharged when the first plunger pump sucks the solvent), and thus feeding a liquid at a constant flow rate is feasible.

The compression of the solvent in the operation of the first plunger pump is a process of increasing the pressure of the sucked solvent from the atmospheric pressure to a pressure at which the second plunger pump discharges (discharge pressure). Here, when the pressure of the solvent reaches a pressure almost the same as the discharge pressure, it is necessary to end the operation of the compression. When the operation of compression continues over the discharge pressure (overcompression), the first plunger pump and the second plunger pump both perform discharge in that section to increase a flow rate as the liquid feeding pump, and the discharge pressure rises correspondingly. When the flow rate fluctuates, analysis accuracy as a liquid chromatograph deteriorates as well as the pulsation of pressure, which is the consequence of the fluctuation, applies loads to a separation column, leading to acceleration of wear.

As a technique that prevents overcompression, Patent Literature 1 discloses a liquid feeding pump provided with a pressure sensor that measures the pressure of a solvent in a first plunger pump and a pressure sensor that measures the pressure of a solvent discharged by a second plunger pump, in which in a compression process, values measured by the pressure sensors are compared with each other to control the operation of the first plunger pump.

Patent Literature 2 discloses a liquid feeding pump having a configuration in which a first plunger pump is connected to a second plunger pump in series and a pressure sensor is provided only on the downstream of the second plunger pump.

CITATION LIST

Patent Literature

Patent Literature 1: Japanese Patent No. 5624825
Patent Literature 2: Japanese Unexamined Patent Application Publication No. 2008-291848

SUMMARY OF INVENTION

Technical Problem

However, in the liquid feeding pump of Patent Literature 1, since the pressure sensor is provided on both the first plunger pump and the second plunger pump, the volumes of the pumps increase. In order to perform the replacement of a solvent for a short time with a reduction in the volumes of the pumps, it may be better that no pressure sensor is provided on the first plunger pump side to reduce the corresponding volume. However, in this case, there is a problem that the operation of the first plunger pump is controlled using only the pressure sensor for the second plunger pump to implement liquid feeding with a small flow rate and a small pulsation of pressure.

In the liquid feeding pump of Patent Literature 2, the pressure sensor is alone provided on only on the second plunger pump side as described above, and it can be said that an increase in the volume of the pump is suppressed. However, Patent Literature 2 does not describe the implementation of liquid feeding with a small flow rate and a small pulsation of pressure at all.

Therefore, the present disclosure is to provide a technique that is capable of reducing the volume of a liquid feeding pump and achieving liquid feeding with a small pulsation.

Solution to Problem

In order to solve the problem, a liquid feeding pump of the present disclosure includes: a first plunger pump that has a first plunger; a second plunger pump that has a second plunger and is connected to the first plunger pump in series; a pressure sensor that is disposed on the downstream side of the second plunger pump; and a control unit that accepts an input of the discharge pressure of a liquid measured by the pressure sensor to control driving of the first plunger and driving of the second plunger, in which when the first plunger pump compresses the liquid, the control unit drives the first plunger at a first speed, and then decreases the speed to a second speed slower than the first speed before the compression is completed, and the control unit discharges the liquid from the second plunger pump by driving the second plunger in parallel with the driving of the first plunger.

Further features relating to the present disclosure will be apparent from the description and the accompanying drawings. Moreover, the mode of the present disclosure will be achieved and realized with elements and the combinations of the elements, the following detailed description, and the accompanying modes of claims.

The description of the present specification is merely typical examples, which should not limit claims or application examples of the present disclosure in any kind of meaning.

Advantageous Effects of Invention

According to the liquid feeding pump of the present disclosure, liquid feeding with a small volume and a small pulsation is made possible.

Problems, configurations, and effects other than ones described above will be apparent from embodiments below.

DESCRIPTION OF EMBODIMENTS

First Embodiment

<Exemplary Configurations of a Liquid Feeding Pump and a Liquid Chromatograph>

Figure 1:
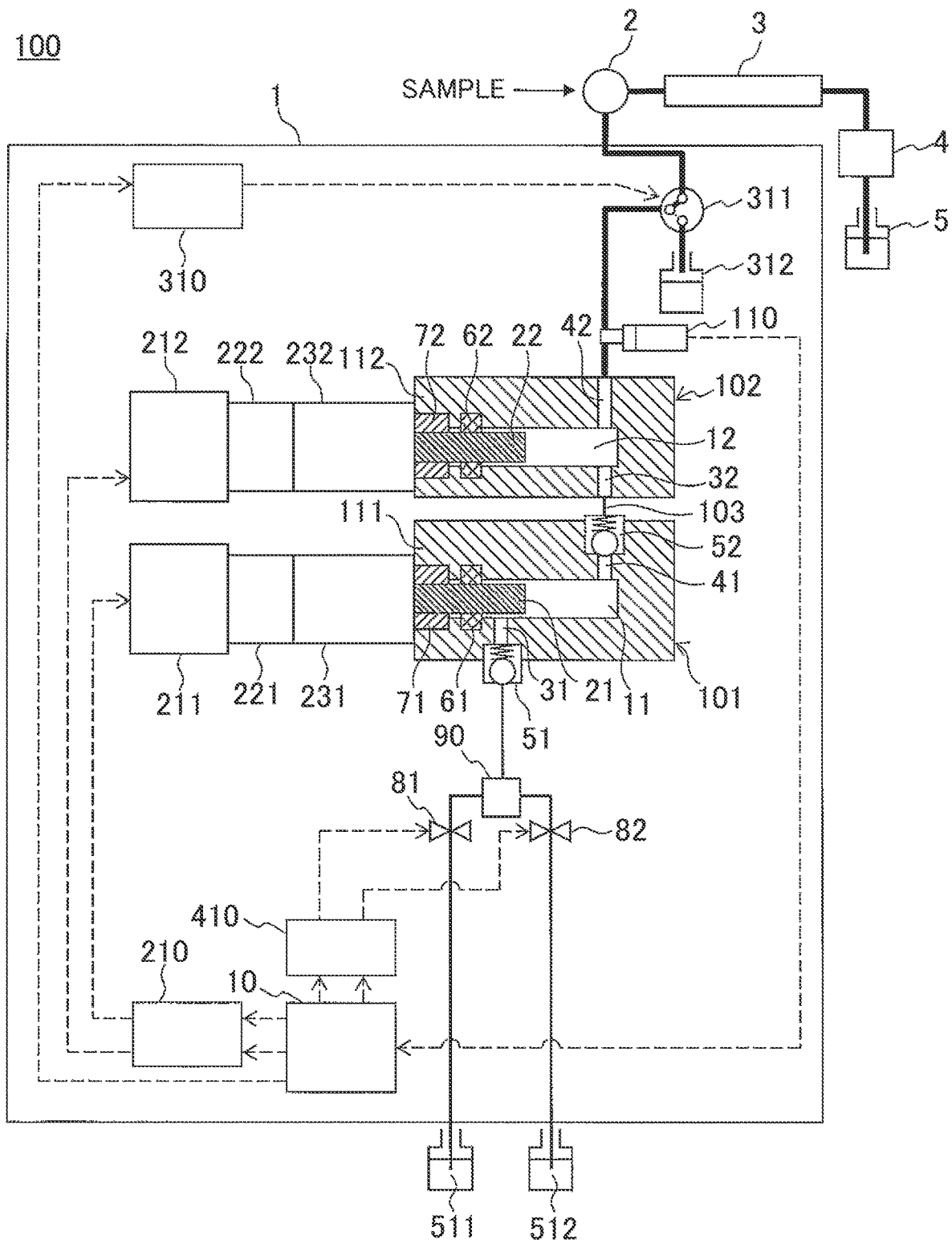
FIG. 1 is a schematic view for showing a configuration of a liquid chromatograph including a liquid feeding pump according to a first embodiment.

FIG. 1 is a schematic diagram showing the configuration of a liquid chromatograph 100 including a liquid feeding pump 1 according to a first embodiment. As shown in FIG. 1, the liquid chromatograph 100 includes the liquid feeding pump 1, an injector 2 that introduces a sample into the liquid chromatograph 100, a separation column 3, a detector 4, and a waste liquid container 5. In regard to the injector 2, the separation column 3, the detector 4, and the waste liquid container 5, since ones generally used in the liquid chromatograph can be used, the detailed configurations of these components will not be described specifically in the present embodiment.

The liquid feeding pump 1 has a controller 10 (control unit), a pressure sensor 110, a first plunger pump 101, a second plunger pump 102, a connection flow passage 103, a first solenoid valve 81, a second solenoid valve 82, a motor driver 210, a purge valve driver 310, a purge valve 311, a waste liquid tank 312, and a solenoid valve driver 410. The first plunger pump 101 is connected to the second plunger pump 102 in series, the first plunger pump 101 is disposed on the upstream side, and the second plunger pump 102 is disposed on the downstream side.

The pressure sensor 110 is installed on the downstream of the second plunger pump 102. The pressure sensor 110 measures the pressure (discharge pressure) of a solvent (liquid) discharged from the second plunger pump 102, and outputs the pressure value to the controller 10.

Although the detail will be described later, the controller 10 gives a command value to the motor driver 210 and the solenoid valve driver 410 for operation based on the discharge pressure measured by the pressure sensor 110 and a predetermined operation sequence. The controller 10 gives a command value to the purge valve driver 310 for operation based on a predetermined operation sequence.

The first plunger pump 101 has a first pump head 111 formed with a first pressurizing chamber 11, a first plunger 21, a first suction passage 31, a first discharge passage 41, a first check valve 51, a second check valve 52, the first seal 61, and a bearing 71. The first check valve 51 is disposed on the passage of the first suction passage 31, the second check valve 52 is disposed on the passage of the first discharge passage 41, and thus the direction of distribution of a solvent liquid is restricted. The first plunger 21 (pressurization member) is slidably retained in the inside of the first plunger pump 101 by the bearing 71. The first seal 61 prevents liquid leakage from the first pressurizing chamber 11.

The second plunger pump 102 has a second pump head 112 formed with a second pressurizing chamber 12, a second plunger 22, a second suction passage 32, a second discharge passage 42, a second seal 62, and a bearing 72. The second check valve 52 is coupled to the second suction passage 32 through the connection flow passage 103. That is, the first plunger pump 101 and the second plunger pump 102 are disposed in series, and the first plunger pump 101 is installed on the upstream side. The second plunger 22 (pressurization member) is slidably retained in the inside of the second plunger pump 102 by the bearing 72. The second seal 62 prevents liquid leakage from the second pressurizing chamber 12.

In the present specification, the term "lower limit point" expresses a position at which the plunger most descends in a range in which the plunger can move in the pressurizing chamber. On the other hand, the term "upper limit point" expresses a position at which the plunger most ascends in a range in which the plunger can move in the pressurizing chamber. The term "ascending" of the plunger expresses motion in the direction of compression or discharge of the solvent in the pressurizing chamber (the motion in the right orientation of FIG. 1), and the term "descending" of the plunger expresses motion in the direction of sucking the solvent into the pressurizing chamber (the motion in the left orientation of FIG. 1).

The reciprocating motion of the first plunger 21 is controlled by a first electric motor 211, a reduction gear 221, and a linear motion device 231. More specifically, the motor driver 210 gives drive electric power to the first electric motor 211 to rotate based on the command value of the controller 10. The rotation of the first electric motor 211 is decelerated by the reduction gear 221, and converted into linear motion by the linear motion device 231, and the first plunger 21 reciprocates.

Similarly, the reciprocating motion of the second plunger 22 is controlled by the second electric motor 212, the reduction gear 222, and the linear motion device 232. More specifically, the motor driver 210 gives drive electric power to the second electric motor 212 to rotate based on the command value of the controller 10. The rotation of the second electric motor 212 is decelerated by the reduction gear 222 and converted into linear motion by the linear motion device 232, and the second plunger 22 reciprocates.

Since the combination of the reduction gear 221 and the linear motion device 231 amplifies and converts the rotation power of the first electric motor 211 into linear motion power, it can be said that the reduction gear 221 and the linear motion device 231 are referred to as a device of a power transmission mechanism in a broad sense. This similarly applies to the reduction gear 222 and the linear motion device 232 as well.

Specific examples of the reduction gears 221 and 222 include a spur gear, a pulley, a planet gear, a worm gear, and the like. A main reason why the reduction gears 221 and 222 are provided is that the torque of the first and the second electric motors 211 and 212 is increased. When the first and the second electric motors 211 and 212 have a capability of generating enough torque, the reduction gears 221 and 222 do not have to be necessarily installed. Specific examples of the linear motion device 231 and 232 include a ball screw, a cam, a rack and pinion, and the like.

The purge valve driver 310 gives drive electric power to the purge valve 311 based on the command value of the controller 10. The purge valve 311 is connected on the downstream of the second plunger pump 102. The purge valve 311 switches a direction of carrying a solvent discharged from the liquid feeding pump 1 to the injector 2 side or the waste liquid tank 312 side.

The solenoid valve driver 410 gives drive electric power to the first solenoid valve 81 and the second solenoid valve 82 based on the command value of the controller 10. On the outside of the liquid feeding pump 1, a solvent container that contains a first solvent 511 and a solvent container that contains a second solvent 512 are installed, and the first solvent 511 or the second solvent 512 can be fed to the liquid feeding pump 1 by opening and closing the first solenoid valve 81 and the second solenoid valve 82 and driving the first plunger pump 101 and the second plunger pump 102 (the first plunger 21 and the second plunger 22).

When the first plunger pump 101 sucks the solvent, states are turned to states in which any one of the first solenoid valve 81 and the second solenoid valve 82 is opened and the other is closed, and any one of the first solvent 511 and the second solvent 512 is sucked. The sucked solvent passes a merging part 90, the first check valve 51, and the first suction passage 31, and is sucked into the first pressurizing chamber 11. The solvent sucked in the first pressurizing chamber 11 is compressed with the ascending of the first plunger 21.

When the solvent is compressed to increase the pressure in the inside of the first pressurizing chamber 11 more than the pressure in the inside of the second pressurizing chamber 12, the solvent passes the first discharge passage 41, the second check valve 52, the connection flow passage 103, and the second suction passage 32, flows into the second pressurizing chamber 12, and is discharged from the second discharge passage 42.

To the solvent discharged from the liquid feeding pump 1, a sample that is an analysis target is injected by the injector 2. The solvent to which the sample is injected is introduced into the separation column 3, separated into individual components, and then the absorbance, fluorescence intensity, refractive index, and the like corresponding to the sample components are detected by the detector 4. The separation column 3 is filled with microparticles, and a fluid resistance, which is generated when the solvent flows through gaps among the microparticles, generates a load pressure ranging from a few tens megapascals to a hundred megapascals or more in the liquid feeding pump 1. The degree of this load pressure varies depending on the diameter and passing flow rate of the separation column 3.

At the time of switching from analysis using the first solvent 511 to analysis using the second solvent 512, prior to analysis using the second solvent 512, the state in which the first solenoid valve 81 is opened is switched to the state in which the first solenoid valve 81 is closed, and then the state in which the second solenoid valve 82 is closed is switched to the state in which the second solenoid valve 82 is opened. Thus, in the inside of the liquid feeding pump 1 (the first check valve 51, the first suction passage 31, the first pressurizing chamber 11, the first discharge passage 41, the second check valve 52, the connection flow passage 103, the second suction passage 32, the second pressurizing chamber 12, the second discharge passage 42, the pressure sensor 110, the purge valve 311, and pipe arrangements coupling those components) and the inside of the injector 2, the separation column 3, the detector 4, and pipe arrangements coupling those components, the first solvent 511 is replaced by the second solvent 512. At this time, time necessary for the replacement of the solvent is shortened, and thus it is possible to increase the number of processes of analysis that is performable within a certain time period.

<Liquid Feeding Method>

The outline of the liquid feeding method when a solvent is normally fed using the liquid feeding pump 1 of the present embodiment will be described. Here, the term "normally feeding liquid" is a liquid feeding method in the case in which a solvent discharged from the liquid feeding pump 1 is carried to the injector 2, the separation column 3, and the detector 4 to analyze a sample. Note that the case in which no sample is analyzed (in the case in which a solvent is fed to the waste liquid tank 312) is the similar operation, and the description is omitted.

Figure 2:
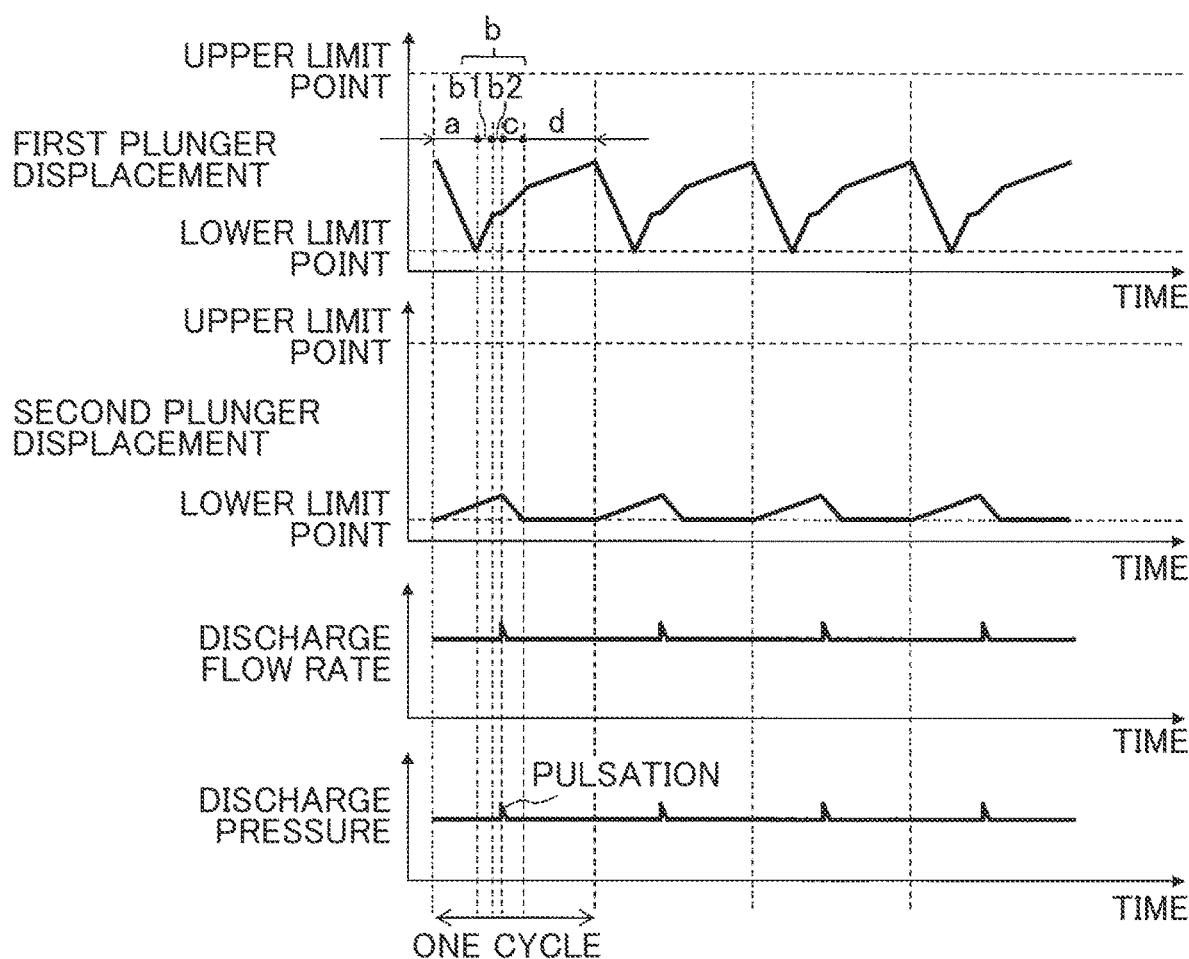
FIG. 2 is a graph for showing the displacement of each plunger and the discharge flow rate and discharge pressure of a solvent when the solvent is normally fed.

FIG. 2 is a graph showing the displacements of the plungers and the discharge flow rate and discharge pressure of a solvent when the solvent is normally fed using the liquid feeding pump 1. In all of four graphs shown in FIG. 2, the horizontal axis expresses time, the vertical axis expresses, sequentially from the top, the displacement of the first plunger 21, the displacement of the second plunger 22, the discharge flow rate of the solvent, and the discharge pressure of the solvent. Here, the discharge flow rate is a flow rate discharged from the liquid feeding pump 1, and the discharge pressure is a pressure detected by the pressure sensor 110. In the displacement of the first plunger 21 and the displacement of the second plunger 22, the ascending direction (the right direction in FIG. 1) is the positive direction, and the descending direction (the left direction in FIG. 1) is the negative direction. In the discharge flow rate, discharge is positive and suction is negative.

In normally feeding a liquid, the first plunger 21 and the second plunger 22 both operate with reference to the lower limit point.

In normally feeding a liquid, the first plunger pump 101 and the second plunger pump 102 both periodically operate. FIG. 2 shows four periods. In one liquid feeding period, in section a in which the first plunger 21 descends to suck the solvent and in section b in which the first plunger 21 ascends to compress the solvent, the solvent is not discharged from the first pressurizing chamber 11, and the second plunger 22 ascends to discharge the solvent. Although the detail will be described later, section b has section b1 in which the first plunger 21 ascends at high speed and section b2 in which the first plunger 21 ascends at low speed. Subsequently from section b in section c in which the second plunger 22 descends to suck the solvent, the first plunger 21 ascends to discharge the solvent sucked by the second plunger 22 and the solvent to be discharged to the pump on the downstream. After that, in section d, the first plunger 21 ascends to discharge the solvent, and the second plunger 22 stops. With such operation, it is possible to keep the discharge flow rate from the liquid feeding pump 1 at almost constant, and the discharge pressure is almost constant. However, at the timing of completion of processing in section b, the first plunger 21 continues the operation of compression to cause the pressure of the solvent in the first pressurizing chamber 11 to exceed the discharge pressure (overcompression), and thus the discharge flow rate instantaneously increases, and in consequence, the discharge pressure also instantaneously increases. That is, pulsation occurs in the discharge pressure.

<Control Method for the Speed of the First Plunger and the Speed of the Second Plunger>

Next, the detail of a method for controlling the speed of the first plunger 21 and the speed of the second plunger 22 in order to reduce the pulsation of the discharge pressure due to the overcompression of the first plunger 21 will be described. The speed of the first plunger 21 and the speed of the second plunger 22 are actually controlled in which the controller 10 outputs a command value to the motor driver 210 to drive the first electric motor 211 and the second electric motor 212 and any other components according to the output value. However, in the following, for simplification, a description will be sometimes given in which the controller 10 directly controls the operations of the first plunger 21 and the second plunger 22.

Figure 3:
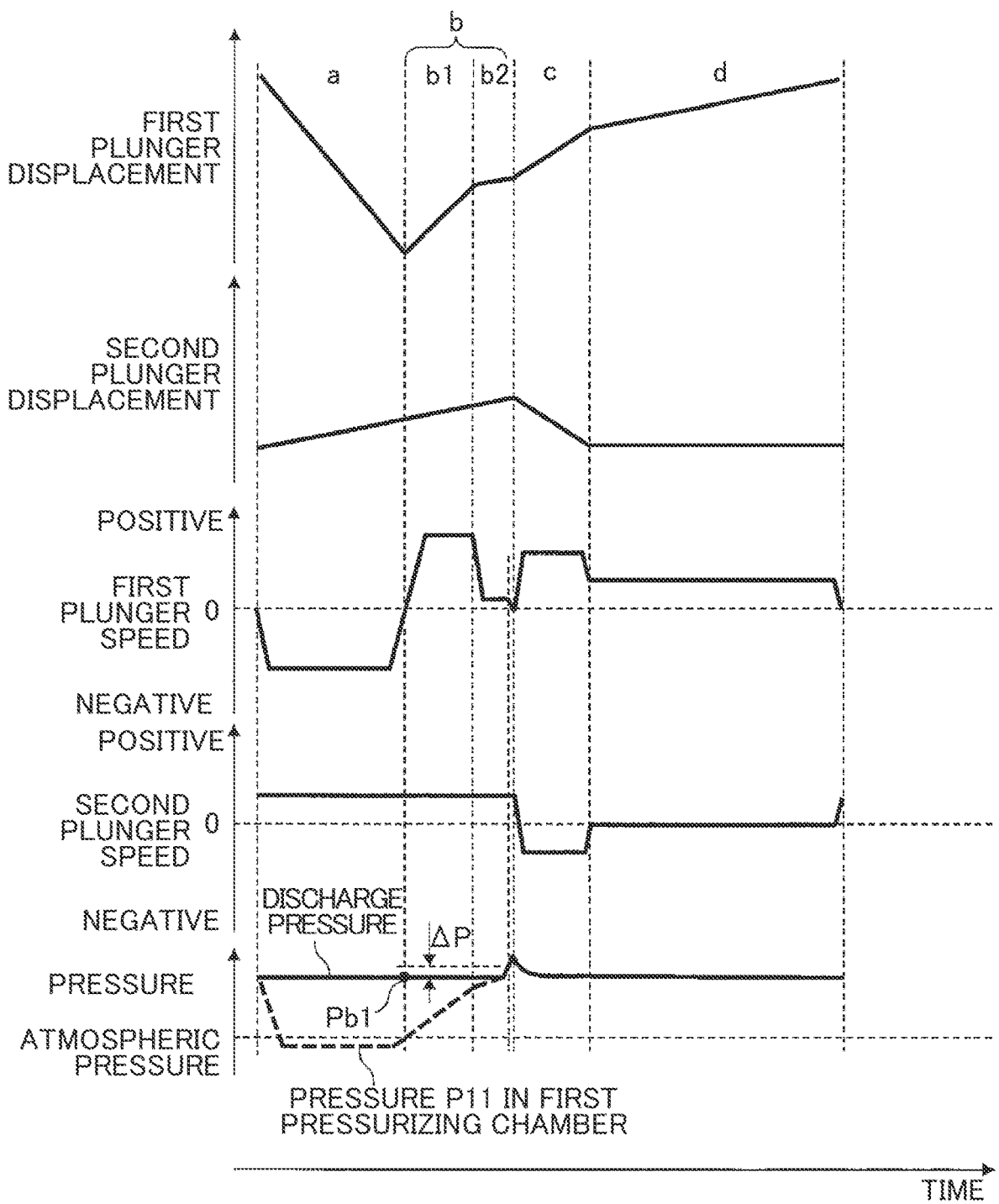
FIG. 3 is a graph for explaining a control method of the speed of a first plunger and the speed of a second plunger.

FIG. 3 is a graph for explaining a control method for the speed of the first plunger 21 and the speed of the second plunger 22 in normally feeding a liquid. FIG. 3 shows the operation for one period alone. In five graphs shown in FIG. 3, the horizontal axis expresses time in all the five graphs, and the vertical axis expresses, sequentially from the top, the displacement of the first plunger 21, the displacement of the second plunger 22, the speed of the first plunger 21, and the speed and pressure of the second plunger 22. The speed of the first plunger 21 and the speed of the second plunger 22 express positive when the plunger ascends, and express negative when the plunger descends. In regard to the pressure, the discharge pressure measured by the pressure sensor 110 is expressed by a solid line, and a pressure P11 of the solvent in the first pressurizing chamber 11 is expressed by a broken line. Here, since there is no unit that measures the pressure P11 of the solvent in the first pressurizing chamber 11, an estimated value of the pressure that is theoretically calculated from (Expression 1), described later, is shown.

In section a, the controller 10 descends the first plunger 21 to the lower limit point (see FIG. 2) at negative speed, and ascends the second plunger 22 from the lower limit point at constant positive speed. When the position of the first plunger 21 reaches the lower limit point, the controller 10 temporarily stops the first plunger 21 (speed 0). The discharge pressure in section a is constant. The pressure P11 of the solvent in the first pressurizing chamber 11 reduces to below the atmospheric pressure less and then becomes constant, and reaches the atmospheric pressure at the end of section a.

In section b1, the controller 10 ascends the first plunger 21 at high speed (at speed higher than that in section b2). At this time, first, the controller 10 ascends the first plunger 21 while accelerating the speed, and then reaches the constant speed (first speed). The controller 10 keeps ascending the second plunger 22 at the constant positive speed the same as in section a. The discharge pressure in section b1 is constant. In consequence with the ascending of the first plunger 21, the solvent is compressed, and the pressure P11 of the solvent in the first pressurizing chamber 11 rises.

In the present embodiment, at the timing at which the pressure P11 of the solvent in the first pressurizing chamber 11 comes close to the discharge pressure, the process transitions from section b1 to section b2. More specifically, in the present embodiment, for example, in the case in which the ratio of the pressure P11 reaches a predetermined ratio or more to the discharge pressure (in the case in which the pressure P11 reaches a predetermined set value or more that is lower than the discharge pressure), the process transitions from section b1 to section b2. In regard to the ratio of the pressure P11 to the discharge pressure when the process transitions from section b1 to section b2, any ratio can be set corresponding to the specifications and the like of the components of the liquid feeding pump 1. Section b1 is operated until the pressure P11 reaches a value as close as the discharge pressure, and thus time for the completion of compression can be shortened. However, in the case in which the pressure P11 suddenly drops for some reason, pulsation increases. Therefore, for example, the controller 10 switches the process from section b1 to section b2 at the timing at which the estimated value of the pressure P11 reaches 90% of the discharge pressure. Note that the predetermined set value is not limited to the ratio of the pressure P11 to the discharge pressure, and for example, a pressure value that is smaller than the discharge pressure by a predetermined value may be set as the predetermined set value.

The pressure P11 of the solvent in the first pressurizing chamber 11 can be estimated with (Expression 1) below from a cross sectional area A of the first plunger 21, a displacement dx of the first plunger 21, a bulk modulus K of the solvent, and a volume V0 of the solvent in the first pressurizing chamber 11 before compression is started.

$$P11 = K \times dV/V0 = K \times A \times dx/V0 \qquad \text{(Expression 1)}$$

dV (=A×dx) is the volume of the solvent compressed in the first pressurizing chamber 11. The displacement dx of the first plunger 21 can be found by measurement by an encoder (not shown in FIG. 1), for example, by the rotation angle of a motor calculated from the number of steps in the case in which the first electric motor 211 is stepper motor, and by the lead of a ball screw.

In section b2, the controller 10 decelerates the ascending speed of the first plunger 21. That is, for example, after the pressure P11 of the solvent in the first pressurizing chamber 11 reaches a predetermined ratio of the discharge pressure, the deceleration of ascending of the first plunger 21 is started. After the speed is decelerated to the predetermined speed (a second speed), the speed of the first plunger 21 is made at constant. Thus, in section b2, as compared with section b1, the first plunger 21 ascends in the first pressurizing chamber 11 at low speed.

When the pressure P11 of the solvent in the first pressurizing chamber 11 increases more than the discharge pressure, pulsation occurs in the discharge pressure due to overcompression. The controller 10 determines that the compression of the solvent is completed from the pulsation of the discharge pressure. More specifically, the controller 10 sets the discharge pressure at the time of starting section b1 (at the time of starting compression) to Pb1. When the output of the pressure sensor 110 increases more than the discharge pressure Pb1 by a predetermined threshold ΔP, the controller 10 determines that the compression of the solvent is completed, starts the deceleration of the first plunger 21, and then temporarily stops the deceleration (decelerates to speed 0). That is, in the case in which the increment of the discharge pressure compared with the discharge pressure at the time of starting compression reaches the predetermined threshold ΔP or more, the controller 10 determines that the compression of the solvent is completed. After that, the process transitions to section c. Note that also in section b2, the controller 10 ascends the second plunger 22 at the constant positive speed the same as in sections a and b1.

Note that when the first plunger 21 is to be stopped, a load proportional to the deceleration is added to the first electric motor 211 due to the inertia of an object that rotates for translation. When a quick stop is made (acceleration is infinite), the first electric motor 211 is stepped out, and liquid feeding is not feasible, and thus it is necessary to decelerate the first electric motor 211 at a deceleration within a load in which the first electric motor 211 is stepped out. Therefore, since the first plunger 21 moves after the discharge pressure reaches the discharge pressure Pb1+the threshold ΔP or more at the time of starting compression and the first electric motor 211 starts deceleration and stops, the solvent is discharged excessively during this period, and the discharge keeps rising. When the speed in section b2 is small, time from the start of deceleration of the first plunger 21 to stop becomes short, and thus a pressure rise at this time becomes small, and pulsation becomes small.

However, when the first plunger 21 is ascended at low speed (e.g., the second speed) from the start of section b, it takes time to the completion of compression. When the second plunger 22 reaches the upper limit point during this period, liquid feeding is not feasible. Therefore, as described above, in the start of section b (section b1), the first plunger 21 is ascended at high speed, the first plunger 21 is ascended at low speed before the completion of compression (section b2), and thus it is possible to shorten the time for section b2 for which the first plunger 21 moves at low speed, and it is possible to achieve stable liquid feeding.

In section c, the controller 10 ascends the first plunger 21 at constant speed, and descends the second plunger 22 at constant speed. In a stage in which the second plunger 22 reaches the lower limit point, the process transitions to section d.

In section d, the controller 10 ascends the first plunger 21 at constant speed lower than in section c. The controller 10 stops the second plunger 22 in section d. In section d, pulsation in consequence with overcompression almost calms down, and the discharge pressure is almost constant.

First Modified Example of the First Embodiment

The description is made in which in section b2 described above, after the first plunger 21 is ascended at the constant second speed, in the stage in which compression is completed, further deceleration is started, and then the deceleration is temporarily stopped. However, a configuration may be provided in which the first plunger 21 is ascended at the constant second speed, compression is completed, and then the process transitions to section c with no temporary stop, and the speed is accelerated. Accordingly, it is possible to shorten the drive period of the pump as well as it is possible to shorten the moving distances of the first plunger 21 and the second plunger 22.

Second Modified Example of the First Embodiment

In the first embodiment, the description is made in which in regard to the determination that the compression of the solvent by the first plunger 21 is completed, the controller 10 determines that the compression of the solvent by the first plunger 21 is completed in the case in which the discharge pressure outputted from the pressure sensor 110 increases by the predetermined threshold ΔP more than the discharge pressure Pb1 at the time of starting section b1 (at the time of starting compression). With this determination method, there is a possibility that in the case in which the pressure immediately before the discharge pressure changes to cause pulsation is greatly varied from the discharge pressure Pb1 at the time of starting compression, it is not possible to appropriately make determination of the completion of compression, leading to an increase in pulsation or to end of the compression process before compression is incomplete. Therefore, instead of this, a configuration may be provided in the case in which the change rate (increasing rate) of the discharge pressure outputted from the pressure sensor 110 reaches a predetermined threshold or more, the controller 10 determines that the compression of the solvent by the first plunger 21 is completed.

Figure 4:
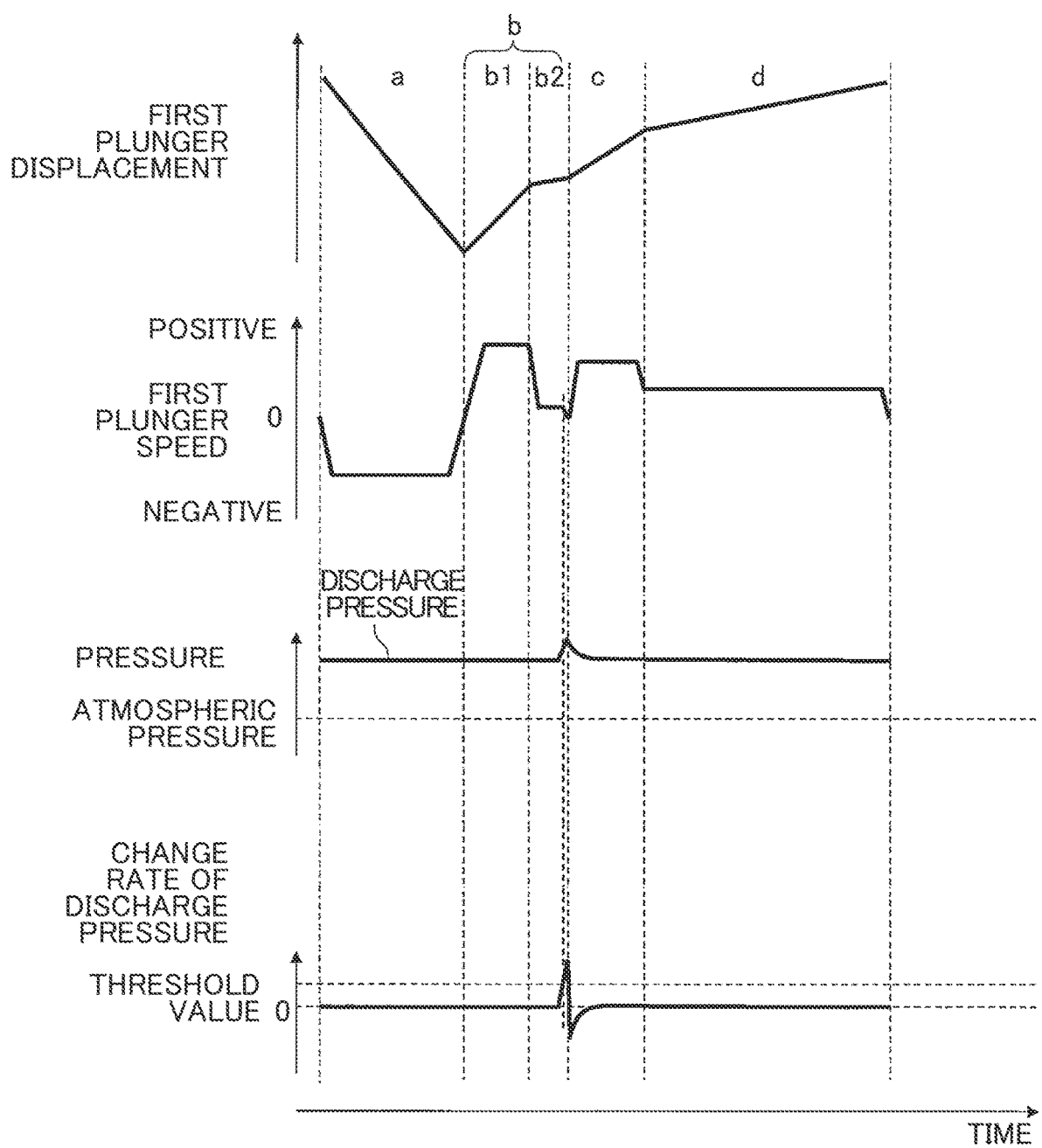
FIG. 4 is a graph for explaining a control method of the speed of a first plunger according to a second modified example.

FIG. 4 is a graph for explaining a control method for the speed of the first plunger 21 according to a second modified example. The graphs of "the displacement of the first plunger", "the speed of the first plunger", and "the pressure" in FIG. 4 are the same as those shown in FIG. 3. In the lowermost graph in FIG. 4, the horizontal axis expresses time, and the vertical axis expresses the change rate of the discharge pressure. As shown in FIG. 4, the controller 10 calculates the change rate of the discharge pressure from the output value of the pressure sensor 110. At the timing at which the change rate of the discharge pressure reaches a predetermined threshold or more, it is determined that the compression of the solvent is completed, and the deceleration of the first plunger 21 is started. Accordingly, even in the case in which the discharge pressure changes, it is possible to more appropriately determine the completion of compression.

Third Modified Example of the First Embodiment

Figure 5:
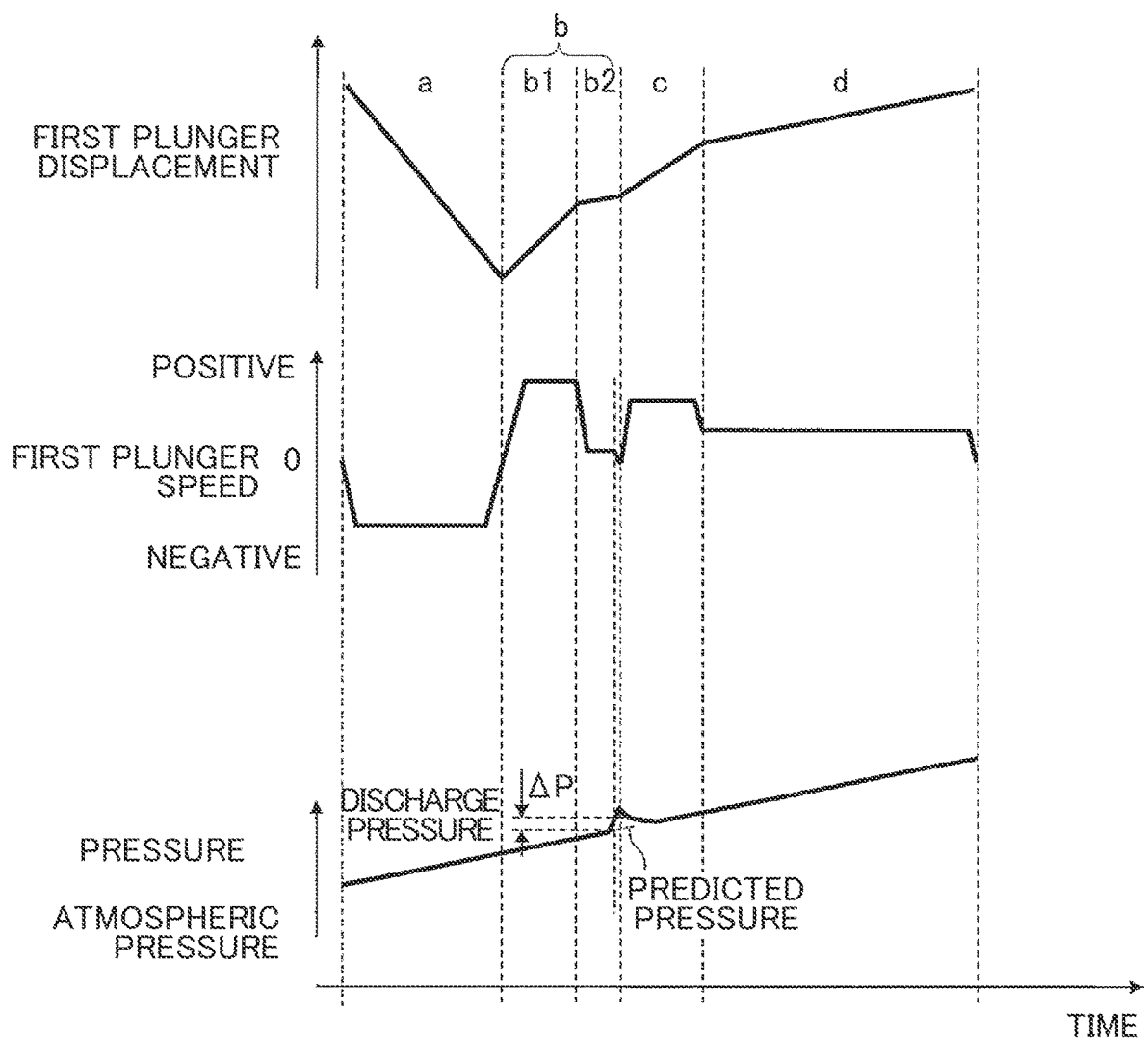
FIG. 5 is a graph for explaining a control method of the speed of a first plunger according to a third modified example.

FIG. 5 is a graph for explaining a control method for the speed of the first plunger 21 according to a third modified example. The graphs of "the displacement of the first plunger" and "the speed of the first plunger" in FIG. 5 are the same as those shown in FIG. 3. In the lowermost graph in FIG. 5, the horizontal axis expresses time, and the vertical axis expresses the discharge pressure, and the case is shown in which the discharge pressure is not constant.

As shown in FIG. 5, in the present third modified example, a configuration may be provided in which the controller 10 predicts the present pressure from a change in the discharge pressure outputted from the pressure sensor 110 (the history of the pressure in section a and section b), and the controller 10 determines that the compression of the solvent by the first plunger 21 is completed in the case in which the output value of the pressure sensor 110 (due to pulsation) increases more than the predicted value by a predetermined threshold ΔP. Accordingly, even in the case in which the discharge pressure changes, it is possible to more appropriately determine the completion of compression.

As described above, the example is described in which the liquid feeding pump 1 of the present embodiment is applied to the liquid chromatograph 100. However, the liquid feeding pump 1 of the present embodiment is also applicable to other devices using the liquid feeding pump including a liquid chromatograph mass spectrometer (LC/MS), for example, non-limiting to the example.

<Technical Effects>

As described above, in the liquid feeding pump 1 of the present embodiment, in the process of the compression of the solvent by the first plunger 21 (section b), first, the first plunger 21 is ascended at the constant first speed, then, when the pressure P11 of the solvent in the first pressurizing chamber 11 reaches a predetermined set value or more that is lower than the discharge pressure, the deceleration of the speed of the first plunger 21 is started to decelerate the speed to the second speed, the speed is made constant at the second speed, and then the first plunger 21 is e ascended. When the output of the pressure sensor 110 increases more than the discharge pressure Pb1 by a predetermined threshold ΔP, it is determined that the compression of the solvent is completed, and then the first plunger 21 is temporarily stopped. As described above, before the compression of the solvent is completed, the speed of the ascending of the first plunger 21 is decelerated, and thus time from the start of deceleration of the first plunger 21 to stop is shortened. Accordingly, the pressure rise at this time is decreased, and pulsation is decreased.

With liquid feeding with a small pressure pulsation, noise generated in the detector becomes small, and it is possible to achieve analysis of high sensitivity. Since pressure pulsation is small, a load added to the separation column is made small, and it is possible to prolong its lifetime.

The liquid feeding pump 1 of the present embodiment only has to have one pressure sensor 110 (on the downstream of the second plunger pump 102 alone) because the pressure of the solvent in the first pressurizing chamber 11 of the first plunger pump 101 is estimated with (Expression 1). Thus, the volume of the pump becomes smaller than in the case of using two pressure sensors, and thus it is possible to accelerate the replacement of the solvent. There is only one pressure sensor, and thus it is possible to reduce the costs of the device more than installing two pressure sensors. Furthermore, there is only one pressure sensor, and thus the adjustment of the difference in the pressure sensors is unnecessary, and it is possible to improve production efficiency.

Second Embodiment

In the first embodiment, the description is made in which in the process of the compression of the solvent by the first plunger 21 (section b), when the pressure P11 of the solvent in the first pressurizing chamber 11 estimated from (Expression 1) described above reaches a predetermined set value or more that is lower than the discharge pressure, the process transitions from section b1 to section b2. In (Expression 1), the pressure P11 of the first pressurizing chamber 11 is proportional to the displacement of the first plunger 21. However, in the case in which a leak occurs between the first seal 61 and the first plunger 21 or a backflow of the first check valve 51 or the like occurs, a delay occurs in the pressure P11 of the solvent in the first pressurizing chamber 11 to the displacement of the first plunger 21 (the pressure P11 does not rise in the region in which the displacement of the first plunger 21 is small). In the case in which a leak occurs between the first seal 61 and the first plunger 21 or a backflow of the first check valve 51 occurs, the first plunger 21 moves to reduce the volume of the solvent compressed in the first pressurizing chamber 11 more than dV (=A×dx). In the case in which a leak occurs between the first seal 61 and the first plunger 21 or a backflow of the first check valve 51 occurs, a change occurs corresponding to the use time of the liquid feeding pump 1 and the like, and thus it is necessary to reflect the latest state. Furthermore, there might be the case in which it is not possible to identify the value of the bulk modulus K of the solvent.

Therefore, in the second embodiment, another determination method for the transition timing from section b1 to section b2 is proposed. For the configuration of a liquid feeding pump of the present embodiment, one that is the same as the liquid feeding pump 1 according to the first embodiment shown in FIG. 1.

In the outline of the liquid feeding method of the present embodiment, unlike the first embodiment, the present pressure P11 in a first pressurizing chamber 11 is estimated using the displacement of a first plunger 21 at the time of the completion of compression in a plurality of periods and the history of the pressure (the relational expression), and the timing of the process transitions from section b1 to section b2 is determined. In the following, the displacement of the first plunger 21 and the history of the pressure at the time of the completion of compression will be described with reference to FIGS. 6 and 7.

Figure 6:
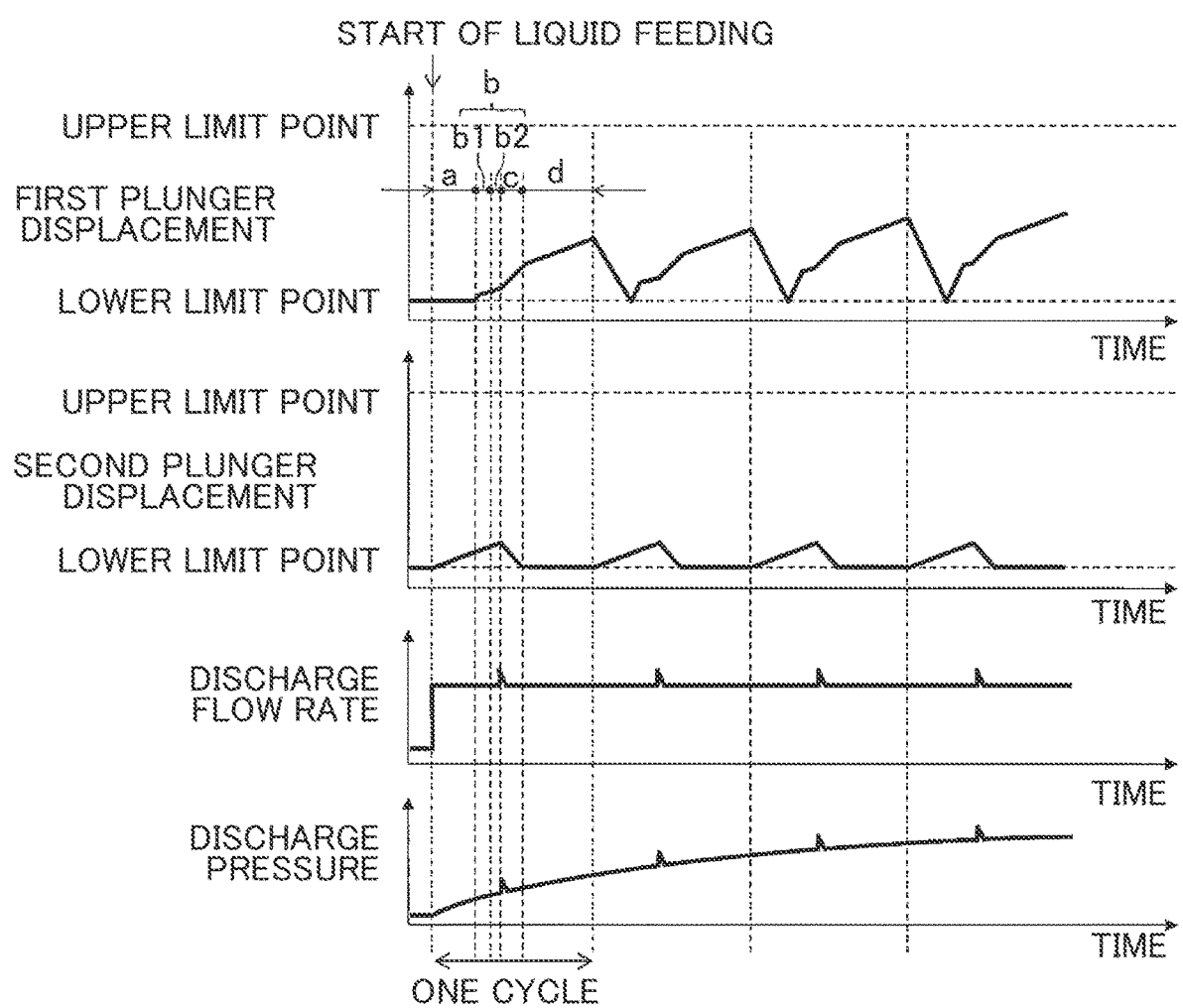
FIG. 6 is a graph for showing the displacement of each plunger and the discharge flow rate and pressure of a solvent when liquid feeding is started by a liquid feeding pump.

FIG. 6 is a graph showing the displacements of the plungers and the discharge flow rate and pressure of the solvent at the time of starting liquid feeding by a liquid feeding pump 1. The outline of four graphs shown in FIG. 6 is the same as that of FIG. 2, and the description is omitted. As shown in FIG. 6, in the stage in which liquid feeding by the liquid feeding pump 1 is started, the displacement of the first plunger 21 increases for every period, the discharge pressure also gradually increases, and the operation for a few periods, the discharge pressure is not in a stationary state.

Figure 7:
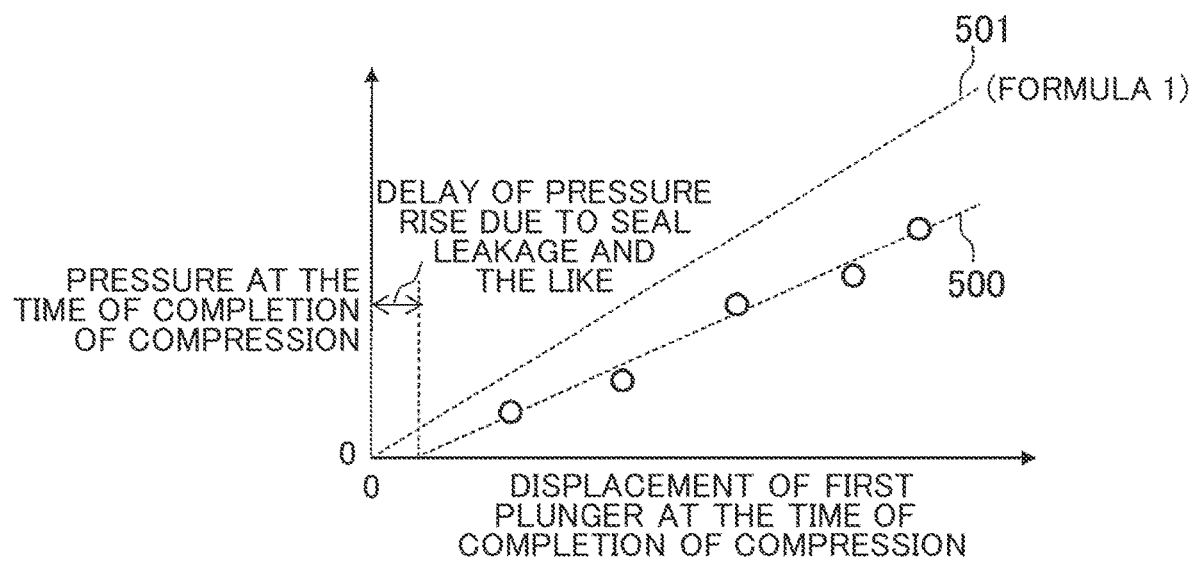
FIG. 7 is a graph for showing a relation between the displacement of the first plunger and a pressure at the time of completion of compression.

FIG. 7 is a graph showing the relationship between the displacement and pressure of the first plunger 21 at the time of the completion of compression. In FIG. 7, the displacement of the first plunger 21 at the time of the completion of compression in section b2 in the periods shown in FIG. 6 is the horizontal axis, and the pressure at the time of the completion of compression is the vertical axis. A controller 10 acquires data on the displacement and pressure of the first plunger 21 at the time of the completion of compression in a plurality of periods, and founds an approximation straight line 500 (and any other approximate function) shown in FIG. 7. This approximation straight line 500 can be regarded as the pressure P11 during the compression of the solvent in the first pressurizing chamber 11 to the displacement of the first plunger 21. As shown in FIG. 7, in the case in which a delay of the pressure rise occurs due to seal leak and the like, the intercept of the approximation straight line 500 becomes a negative value (not zero). The slope of the approximation straight line 500 is different from the slope of the straight line 501 of (Expression 1) described above that is an ideal state with no seal leak and the like.

Therefore, with the use of this approximation straight line 500, it is possible to more appropriately estimate the pressure P11. In section b1, when the pressure P11 of the solvent in the first pressurizing chamber 11 estimated from the approximation straight line 500 reaches a predetermined ratio or more (a predetermined set value or more) to the discharge pressure, the process transitions to section b2, and the deceleration of the first plunger 21 is started.

Note that as the number of pieces of data when the above-described approximation straight line 500 is larger, it is possible to reduce errors. Immediately after liquid feeding is started (e.g., from the first period to the second period), there is no history in the past or there is small history, and it is not possible to find the approximation straight line 500. Therefore, the pressure P11 of the solvent in the first pressurizing chamber 11 is estimated by (Expression 1) with the method of the first embodiment, and the timing of starting the deceleration of the first plunger 21 is determined. After that, in a stage in which history for a few periods is acquired, determination may be switched to determination using the approximation straight line 500 and the present displacement of the first plunger 21.

<Technical Effects>

According to the liquid feeding pump 1 of the present embodiment, the controller 10 estimates the present pressure P11 of the solvent in the first pressurizing chamber 11 based on the approximation straight line 500 found from the displacement of the first plunger 21 and the history of the pressure at the time of the completion of compression (history for a plurality of periods from the start of liquid feeding) and the present displacement of the first plunger 21 in the process of the compression of the solvent by the first plunger 21 (section b). When the estimated pressure P11 reaches a predetermined set value or more that is lower than the discharge pressure measured by a pressure sensor 110, the controller 10 determines that compression is completed, and starts the deceleration of ascending of the first plunger 21. Thus, as compares with the first embodiment, it is possible to more accurately estimate the pressure P11 of the solvent in the first pressurizing chamber 11, and it is further possible to make pressure pulsation smaller.

Modified Examples

The present disclosure is not limited to the foregoing embodiments, and includes various modified examples. For example, the foregoing embodiments are described in detail for easily understanding the present disclosure, and all the described configurations are not necessarily included. A part of an embodiment can be replaced by the configuration of another embodiment. To the configuration of an embodiment, the configuration of anther embodiment may be added. In regard to a part of the configurations of the embodiments, a part of the configuration of another embodiment may be added, removed, or replaced.

LIST OF REFERENCE SIGNS

- 1 liquid feeding pump
- 2 injector
- 3 separation column
- 4 detector
- 5 waste liquid container
- 10 controller
- 11 first pressurizing chamber
- 12 second pressurizing chamber
- 21 first plunger
- 22 second plunger
- 31 first suction passage
- 32 second suction passage
- 41 first discharge passage
- 42 second discharge passage
- 51 first check valve
- 52 second check valve
- 100 liquid chromatograph
- 101 first plunger pump
- 102 second plunger pump
- 103 connection flow passage
- 110 pressure sensor
- 210 motor driver
- 310 purge valve driver
- 410 solenoid valve driver

What is claimed is:

1. A liquid feeding pump comprising:
a first plunger pump that has a first plunger;
a second plunger pump that has a second plunger and is connected to the first plunger pump in series;
a pressure sensor that is disposed on a downstream side of the second plunger pump and is configured to measure a discharge pressure of a liquid discharged from the second plunger pump and output a discharge pressure value of the discharge pressure; and
a controller configured to accept an input of said discharge pressure value1 to control driving of the first plunger and driving of the second plunger, and to control discharge of the liquid from the second plunger pump by driving the second plunger in parallel with the driving of the first plunger,
wherein the controller is configured to
estimate a pressure of the liquid in the first plunger pump;
drive, when the first plunger pump pressurizes the liquid, the first plunger at a first speed until the estimated pressure of the liquid in the first plunger pump reaches a first predetermined value, then drive the first plunger at a second speed slower than the first speed while continuing to pressurize the liquid, and then temporarily stop the driving of the first plunger based on a determination that the discharge pressure value has increased, from a time of starting pressurization, by an amount equal to or larger than a predetermined threshold value, while driving the second plunger at a third speed different from the first speed and the second speed,
based on the determination that the increased amount of the discharge pressure value is equal to or larger than the predetermined threshold value, drive the first plunger from at a fourth speed, while controlling the second plunger to suck the liquid until a lower limit point of the second plunger is reached, and
in response to reaching the lower limit point of the second plunger, stop the driving of the second plunger and drive the first plunger at a fifth speed that is lower than the fourth speed.

2. The liquid feeding pump according to claim 1, wherein the controller is configured to determine the estimated pressure of the liquid in the first plunger pump based on a bulk modulus of the liquid and a displacement of the first plunger.

3. The liquid feeding pump according to claim 1, wherein the temporary stopping of the driving of the first plunger is based on a determination that the pressurization has been completed.

* * * * *